United States Patent [19]

Brearley et al.

[11] Patent Number: 4,920,493
[45] Date of Patent: Apr. 24, 1990

[54] TRANSDUCER CONTROL IN VEHICLE BRAKING SYSTEMS

[75] Inventors: Malcolm Brearley, Solihull; Richard B. Moseley, Birmingham, both of England

[73] Assignee: Lucas Industries public limited company, Birmingham, England, England

[21] Appl. No.: 56,625

[22] Filed: May 18, 1987

[30] Foreign Application Priority Data

May 17, 1986 [GB] United Kingdom ............... 8612065

[51] Int. Cl.⁵ ...................... G01L 25/00; G06F 15/20
[52] U.S. Cl. .......................... 364/426.01; 364/571.04; 364/571.05
[58] Field of Search ............. 364/426.01, 426.02, 364/571.01, 571.04, 571.05; 303/92; 73/1 R, 1 B, 1 D, 1 E

[56] References Cited

U.S. PATENT DOCUMENTS

| | | | |
|---|---|---|---|
| 4,161,782 | 7/1979 | McCracken | 364/571 |
| 4,198,677 | 4/1980 | Brunner et al. | 364/571 |
| 4,219,244 | 8/1980 | Griner et al. | 303/92 |
| 4,446,715 | 5/1984 | Bailey | 364/571 |
| 4,497,026 | 1/1985 | Braschel et al. | 364/426.02 |
| 4,538,228 | 8/1985 | Brearey et al. | 364/426.01 |
| 4,586,403 | 5/1986 | Lee et al. | 364/571 |
| 4,633,424 | 12/1986 | Norberg et al. | 364/571 |
| 4,669,046 | 5/1987 | Kubo | 364/426.02 |
| 4,670,847 | 6/1987 | Furuse | 364/571 |
| 4,718,013 | 1/1988 | Kubo | 364/426 |
| 4,719,586 | 1/1988 | Moyer et al. | 364/571 |

Primary Examiner—Gary Chin
Attorney, Agent, or Firm—Scrivener and Clarke

[57] ABSTRACT

A vehicle braking system of the type having an electronic control computer for determining the extent of application of the vehicle brakes in accordance with given driver braking demands, includes a plurality of analogue transducers which provide analogue input signals to the electronic control computer representative of a corresponding plurality of variable operating parameters, such as driver braking demand, axle load, applied braking pressure, and vehicle decelerations. In order to enable recalibration of said transducers new zero/tare figures from each transducer are entered into the control computer and provided they pass a process of checking, are arranged to override the existing zero/tare data, whereupon they are used by the system until the next zero/tare recalibration service operation is selected.

9 Claims, 3 Drawing Sheets

TRANSDUCER CONTROL IN VEHICLE BRAKING SYSTEMS

The present invention is concerned with vehicle braking systems of the type having electronic control means for determining the extent of application of the vehicle brakes in accordance with given driver braking demands. Such systems might be formed, for example, in passenger cars, commercial road vehicles, rail vehicles and the like to control the basic braking function or other similar functions such as wheel slide prevention (WSP).

Electrically controlled braking systems of this type typically include an input transducer producing the driver's braking demands in electrical terms, a suitable electronic controller, electrical relay valves with integral pressure transducers on each axle of the vehicle, and load sensing transducers on each axle. Overall performance feed back is generated by a vehicle decelerometer.

Normal system operation requires all the aforegoing transducers to be accurately calibrated. However, all are subject to drift over a period of operation since, although the controller is a digital system, the individual transducers are essentially analogue devices and are subject, inter alia, to inherent or transient instabilities. In such known systems, therefore, costly and time-consuming manual recalibration of the individual transducer is necessary from time to time.

It is an object of the present invention to provide a solution to this problem of transducer calibration.

In accordance with the present invention, new zero/tare figures for each transducer are introduced to non-volatile memory of a control computer, these figures being used, after a process of checking, to override the existing zero or tare data, and the new data then being used by the system until the next zero/tare re-setting service operation is selected.

Recalibration of the zero points or re-establishment of tare weights is preferably selected by an obscured pushbutton or buttons or on receipt of a coded signal from test equipment containing a "re-zero" push button. Such recalibration is, however, only permitted if the vehicle is (a) stationary, (b) in a level attitude and (c) detectably unladen.

The above basic concept may be modified by arranging that the new zero or tare readings are only accepted if the latter readings are within pre-set absolute limits, and/or the readings are within a pre-set range of the equivalent stored figures.

The method of executing the recalibration of zero-tare readings may involve the use of multiple "buttons" which require simultaneous operation. This prevents or minimises the risk of accidental operation of the recalibration apparatus.

The invention is described further hereinafter, by way of example only, with reference to the accompanying drawings, in which.

Figure 1:
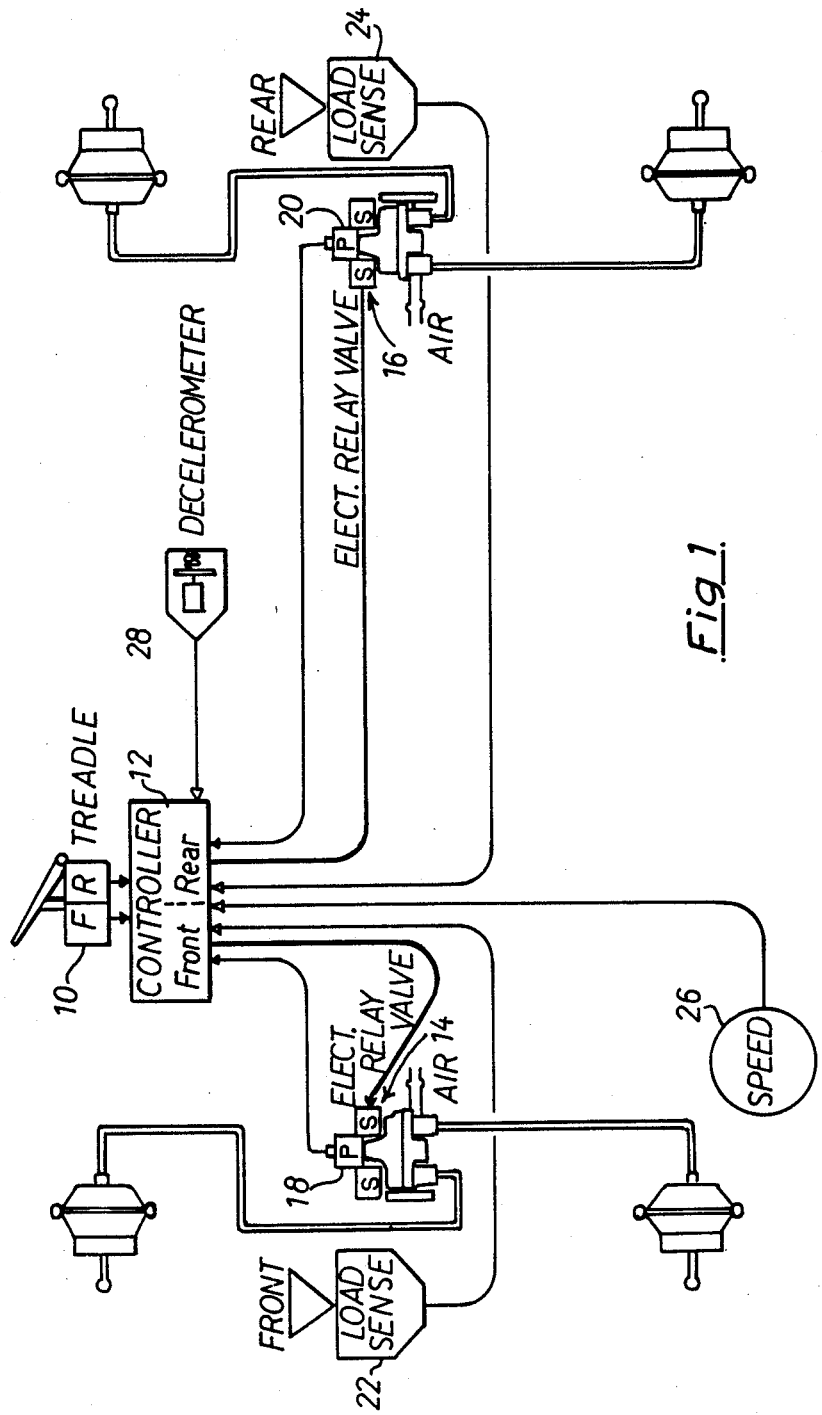
FIG. 1 is a diagrammatic illustration of a typical electronically controlled braking system.

The system of FIG. 1 includes an input transducer 10 producing the driver's braking demands in electrical terms, a suitable electronic controller/computer 12, electronic relay valves 14,16 for the front and rear axles, with respective integral pressure transducers 18,20, load sensing transducers 22,24 and a speed sensing transducer 26. Overall performance feed back is generated by a vehicle decelerometer 28.

As explained initially, the various transducers are analogue devices which are subject to drift and must, in existing systems, be recalibrated regularly in order to maintain the required operation of the system.

Figure 2:
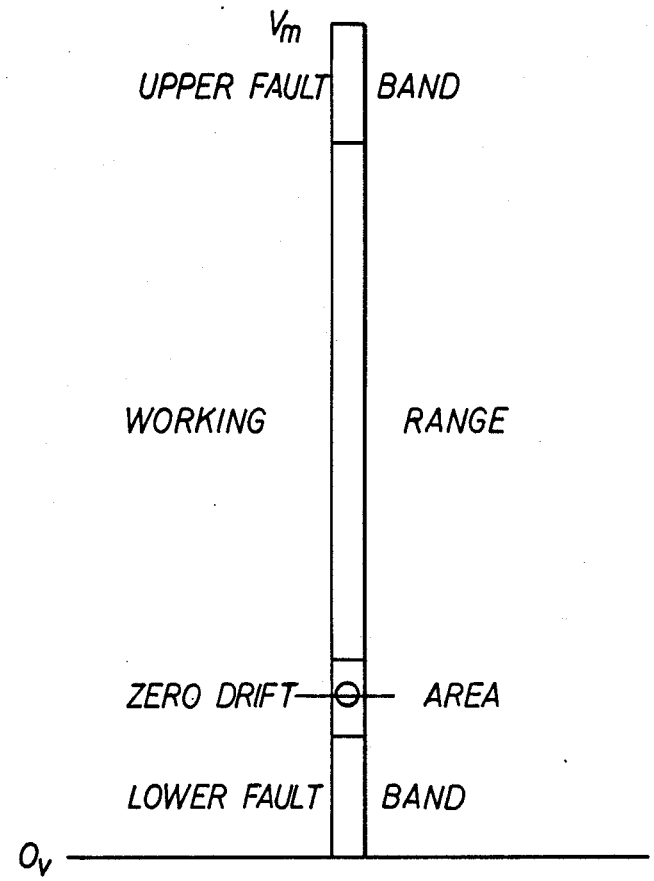
FIG. 2 illustrates the presence of fault detection bands in relation to the output voltage Vm of a typical transducer, showing the upper and lower fault detection bands, the working range and the zero drift region.

In the present system, the computer/controller 12 uses non-volatile read/write memory devices adapted to hold calibration constants set inside the computer to suit the various transducers and also zero or tare readings taken from these samd transducers when in a predetermined nominal state. A braking system can be designated as being in this "nominal state" when the vehicle is stationary, on level ground, with no brake demand, and with all control solenoids de-energised. In this condition, zero and tare readings can be taken from all the braking system transducers, including the demand input unit 10, and stored in said memory devices, after suitable qualification, as the new zero and tare values which will be employed in the system thereafter, at least until the next recalibration operation. These values are important as all the transducers employed have to present an output voltage range which includes high and low fault detection band, as shown in FIG. 2.

"Zero" drift can be accepted only inside a pre-set band within which it is reasonable to expect calibration changes to occur naturally. New readings are therefore qualified against old readings before acceptance, using the following rules:
 (i) The new readings must be within pre-set absolute limits to be accepted.
 (ii) The new readings must be within a pre-set range of currently stored equivalent values to be accepted.

These provisions are necessary to allow faulty transducers to be detected since an attempt to zero out unacceptable values causes the computer system to register a failure and to announce the source of the problem via a diagnostic output line as described hereinafter in connection with FIG. 3.

These conditions which must be met for new readings to be accepted, must also prevent new zero data being accepted when the vehicle is not level or not unladen.

Replacement of a damaged transducer requires a special re-set function in order to allow the qualification conditions to be overridden and the new zero reading to be accepted. Special diagnostic input codes should be recognised to ensure that this condition can only be produced by authorised engineering staff, with these codes each relating to an individual override on one selected transducer. No means will be provided of obtaining blanket override for all transducers which could lead to misoperation.

It is feasible that re-zoning (recalibration) operations are frequent and are performed from a coded input signal applied to the diagnostic input or from a self-contained or plugged-in push button. In the latter case, as a precaution against accidental recalibration, a number of more complex operations are listed in the following options before re-zeroing can be obtained:
  (i) The push button must be pressed and released at precise times after power to the controller is turned on.
  (ii) The button must be pressed a pre-set number of times.
  (iii) Multiple buttons must be simultaneously pressed.
  (iv) Multiple buttons must be pressed in sequence.
  (v) The button is incorporated into the diagnostic equipment which plugs into the controller and causes a special code or pulse sequence to be applied at a pre-set time after power up to cause the re-zero action to be initiated.

Figure 3:
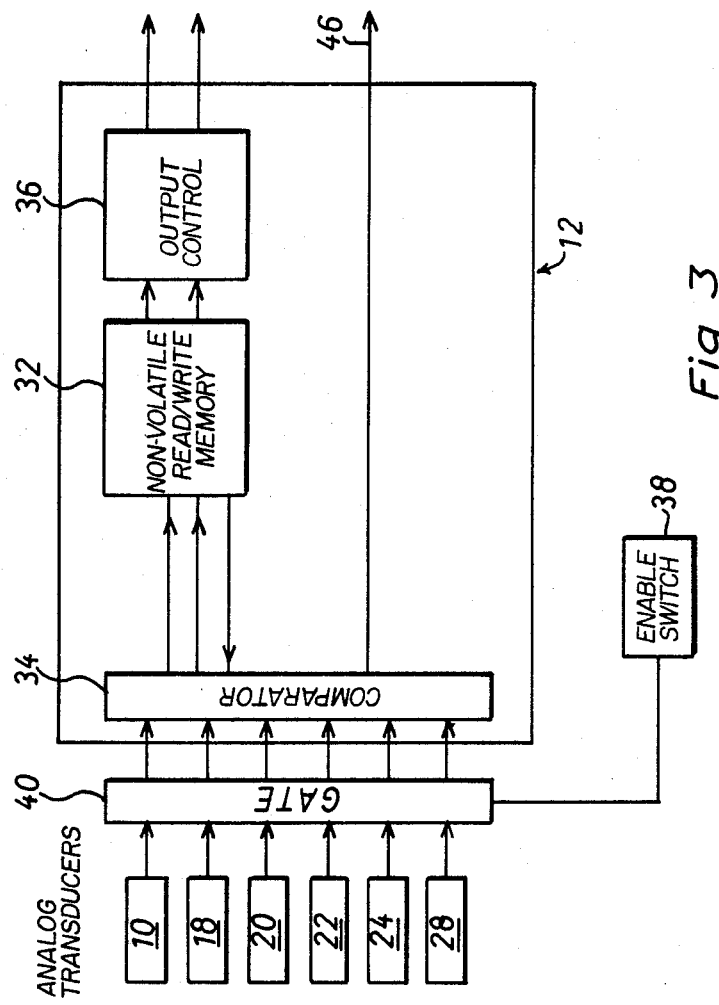
FIG. 3 is a highly diagrammatic block diagram of one possible embodiment for performing the present invention.

Referring now to FIG. 3, there is shown highly diagrammatically one possible embodiment for performing the present invention. The computer/controller 12 is shown as comprising a non-volatile read/write memory 32, a comparator 34 and an output control 36. Signals from different transducers 10, 18, 20, 22, 24, 28 are fed into the comparator unit 34 of the computer/controller 12 via a gate 40. The items 32, 34 and 36 need not be discrete components, and, for example, may be parts of a single component. However, they have been separated in FIG. 3 in order to clarify the operation of the apparatus.

In order to ensure that recalibration occurs only when the vehicle is in its "nominal state" as described previously, it is necessary for an operator to check that the vehicle is stationary, on level ground, with no brake demand and with all control solenoids de-energised. If the operator considers all these conditions to be fulfilled, he activates an enabling switch 38 to the computer/controller 12 via the gate 40. Unless the operator activates the enabling switch 38, calibration can not take place.

When the conditions are fulfilled, and the enabling signal is sent to the gate 40, the inputs from the transducers 10, 18, 20, 22, 24, 28 having analogue outputs are supplied to the comparator unit 34 via the gate 40. The values from the transducers will be zero values for the demand input unit 10 and the decelerometer 28, and tare values for the pressure transducers 18, 20 and the load sensing transducers 22, 24. The zero/tare values are compared in the comparator 34 with the values previously stored in the non-volatile read/write memory 32. As mentioned before, the new readings are qualified against the old readings stored in the non-volatile read/write memory 32 using the following rules:
  (i) The new readings must be within pre-set absolute limits to be accepted.
  (ii) The new readings must be within a pre-set range of currently stored equivalent values to be accepted.

If the above two conditions are fulfilled, the new values are then input into the memory 32, and the apparatus is thereby calibrated. The memory 32 and the output control unit 36 thereafter act during operation of the braking system to adjust the relative response to the braking demand of the user, having re-calibrated the system using the new zero/tare values.

If the offered zero/tare values do not satisfy conditions (i) and (ii), then the comparator 34 indicates via a diagnostic output line 46 that the signal from one or more of the transducers is not within the acceptable range of values, and that one or more of the transducers is faulty.

We claim:

1. In a braking system of the type having electronic control for determining the extent of application of the vehicle brakes in accordance with driver braking demands, the system comprising:
  (a) an electronic control computer; and
  (b) a plurality of analog transducers which provide analog input signals to said electronic control computer representative of a corresponding plurality of variable braking operating parameters;
the improvement wherein, in order to enable recalibration of said transducers, the system further comprises within said computer
  (c) an operator-controlled gate means;
  (d) a comparator means having first and second inputs;
  (e) the outputs of said transducers being selectably connectable to said first input of the comparator means by way of said gate means;
  (f) non-volatile read/write memory means for storing zero and tare values for said variable braking operating parameters;
  (g) the output of said non-volatile rear/write memory means being connected to said second input of said comparator means, whereby existing zero and tare values stored in said memory means can be compared in said comparator means with new zero and tare values supplied by said transducers; and
  (h) the output of said comparator means providing a control signal coupled to said non-volatile read/write memory, whereby, if the result of said comparison lies within prescribed limits, said new zero and tare values are accepted and introduced into said non-volatile read/write memory means to override the existing zero and tare values but only after pre-established conditions have been met.

2. A vehicle braking system according to claim 1, including means within said computer for checking the levels of said new zero and tare values and only accepting same if they lie within predetermined absolute limits.

3. A vehicle braking system according to claim 1, including means within said computer for checking the levels of said new zero and tare values and only accepting same if they lie within a pre-set range of the values stored in said memory means for the respective transducer.

4. A vehicle braking system according to claim 1, wherein recalibration of said transducers is selected on receipt of a coded signal from test equipment containing a "re-zero" push button.

5. A braking system of the type having electronic computer control for determining the extent of application of the vehicle brakes in accordance with driver braking demands, the system comprising a plurality of analog transducers which provide analog input signals to an electronic control computer representative of a corresponding plurality of variable braking operating parameters, said plurality of analog transducers including at least a first analog transducer which produces a driver's braking demand signal, second and third analog transducers which produce electrical signals representative of the braking pressure applied to the front wheels and rear wheels, respectively, fourth and fifth analog transducers which produce electrical signals representative of the load on the front and rear axles of the vehicle, respectively, and a deceleration transducer which produces an electrical signal representative of vehicle deceleration, and wherein, in order to enable recalibration of said at least first to fifth transducers, the system further comprises within said computer an operator-controlled gate means, a comparator means having first and second inputs, the outputs of said transducers being selectably connectible to said first input of the comparator means by way of said gate means, non-volatile rear/write memory means for storing zero and tare values for said variable braking operating parameters, the output of said non-volatile read/write memory means being connected to said second input of said comparator means whereby existing zero and tare values stored in said memory means can be compared in said comparator means with new zero and tare values supplied by said transducers, and the output of said comparator means providing a control signal coupled to said non-volatile read/write memory, whereby, if the result of said comparison lies within prescribed limits, said new zero and tare values are introduced into said non-volatile rear/write memory means to override the existing zero and tare values.

6. A braking system of the type having electronic control for determining the extent of application of the vehicle brakes in accordance with driver braking demands, the system comprising a plurality of analog transducers which provide analog input signals to an electronic control computer representative of a corresponding plurality of variable braking operating parameters, said plurality of analog transducers including at least first analog transducer which produces a driver's braking demand signal, second and third transducers which produce electrical signals representative of the braking pressure applied to the front wheels and rear wheels, repectively, fourth and fifth analog transducers which produce electrical signals representative of the load on the front and rear axles of the vehicle, respectively, and a deceleration transducer which produces an electrical signal representative of vehicle deceleration, and wherein, in order to enable recalibration of said at least first to said fifth transducers, the outputs of said transducers are connected, via an operator controlled gate means, to first inputs of a comparator means in the control computer whereby to supply new zero and tare values to said inputs of the comparator, second inputs of said comparator means being connected to the output of a non-volatile read/write memory means which stores zero and tare values for said variable braking operating parameters, the output of the comparator means providing a control signal coupled to said non-volatile read/write memory means, whereby, if the result of said comparison between said new zero and tare values supplied by said transducer and the existing zero and tare values supplied by said memory means lies within prescribed limits, said new zero and tare values are accepted and introduced into said non-volatile read/write memory means to override said existing zero/tare values.

7. A system according to claim 6, wherein said gate means is connected to an operator controlled enabling switch so that the gate means is enabled to accept new calibration zero and tare values only if the enabling switch means is operated.

8. A system according to claim 6, including means in said computer which compares the new zero and tare values with the existing values and only accepts the new values if they lie within predetermined absolute limits.

9. In a braking system of the type having electronic computer control for determining the extent of application of the vehicle brakes in accordance with braking demands, and which includes a plurality of analog transducers which provide analog input signals to an electronic control computer representative of a corresponding plurality of variable braking operating parameters, a method of enabling recalibration of said transducers comprising entering new zero and tare values from each transducer into a comparator in said computer via an operator controlled gate, comparing said new values with existing zero and tare values stored in a non-volatile memory of said computer and, passing the new values to said memory to replace the existing values, so long as the difference between the existing values and the new values falls within predetermined limits, and thereafter using the new values in the system until the next recalibration operation is selected.

* * * * *